United States Patent Office 3,145,218
Patented Aug. 18, 1964

3,145,218
CROTONOLACTONES
Josef Fried and Eugene E. Galantay, Princeton, N.J., assignors to Olin Mathieson Chemical Corporation, New York, N.Y., a corporation of Virginia
No Drawing. Filed Oct. 2, 1962, Ser. No. 227,710
10 Claims. (Cl. 260—343.6)

This invention relates to new chemical compounds and more particularly to new disulfides.

The new final products of this invention include bis-($\alpha$-hydroxy-$\alpha,\beta$-crotonolactone-$\beta$-methylene)disulfide and salts, esters and ether derivatives thereof. Particularly preferred are the salts with alkali metals, alkaline earth metals, ammonia and amines; the esters with any organic acid, such as carboxylic acids; and the ethers with alkanols and aralkanols. Such compounds can be represented by the general Formula I:

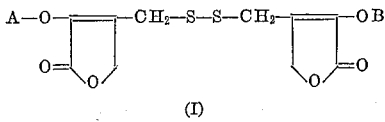

(I)

wherein A and B are each independently selected from the group consisting of hydrogen; alkali metal (e.g. sodium and potassium); alkaline earth metal; ammonium; substituted ammonium, such as primary amines, as exemplified by the lower alkyl amines (e.g. methylamine, ethylamine, propylamine, and n-hexylamine), and monocyclic ar(lower alkyl)amines (e.g. benzylamine), and secondary amines, as exemplified by the di(lower alkyl)amines (e.g., dimethylamine, diethylamine, diisopropylamine, methylethylamine, and methyl-n-hexylamine) monocyclic ar(lower alkyl)-(lower alkyl)amines (e.g. benzylmethylamine and phenethylmethylamine), and saturated N-heterocyclics (e.g., piperidino, pyrrolidino, morpholino and N-methylpiperazino); alkyl (preferably lower alkyl, such as methyl, ethyl, propyl, n-butyl and n-hexyl); aralkyl[preferably monocyclic ar(lower alkyl), such as benzyl, phenethyl, and 4-phenylbutyl]; and acyl, such as the acyl radical of a hydrocarbon carboxylic acid of less than twelve carbon atoms, as exemplified by the lower alkanoic acids (e.g., acetic, propionic, butyric, enanthic and caproic acid), the lower alkenoic acids (e.g., acrylic, 2-butenoic and 3-hexenoic acid), the monocyclic ar(lower alkanoic)acids (e.g., the phenylacetic acid and $\beta$-phenylpropionic acid), the monocyclic ar(lower alkenoic) acids (e.g. cinnamic acid), the monocyclic aryl carboxylic acids (e.g., benzoic acid), the cycloalkenecarboxylic acids (e.g. cyclopentanecarboxylic acid) and the cycloalkenecarboxylic acids (e.g. 1-cyclohexenecarboxylic acid).

It is obvious to those skilled in the art that Compounds I, as well as some of the intermediates leading to them as described hereinafter, can, if A and/or B represent hydrogen, also exist in tautomeric $\alpha$-keto-$\gamma$-butyrolactone form.

The compounds of this invention are highly active against a large number of microbes, especially against gram positive bacteria (e.g., *Staphylococcus aureus* and *Mycobacterium tuberculosis*) and fungus (e.g., *Trichophyton mentagrophytes*) and hence may be used in the treatment of conditions wherein such microbes are present.

The final products of this invention are prepared by the processes of this invention, employing certain new compounds of this invention as intermediates.

In the initial step of the process of this invention, a compound of the general formula

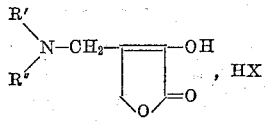

wherein R' and R" are preferably lower alkyl and X is an anion derived from an inorganic acid, preferably chloride, is reacted in an aqueous solution with a salt whose cation forms an insoluble precipitate with the anion (X) of the starting compound and whose anion is derived from a weak and volatile acid. Such salts include, if X is chlorine, silver carbonate and silver acetate, for example. The reaction is preferably conducted in the cold. The process yields new zwitterions of this invention of the general Formula II

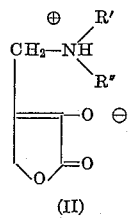

(II)

wherein R' and R" are preferably lower alkyl or together with the nitrogen represent a saturated N-heterocyclic radical (e.g. piperidino, pyrrolidino, morpholino and N-methylpiperazino).

Suitable starting materials can be prepared by condensing pyruvic acid with formaldehyde and a secondary ammonium salt, preferably a secondary amine hydrochloride, such as the hydrochloride salts of dimethylamine, diethylamine, dipropylamine, diisopropylamine and methyl-n-hexylamine, piperidine, pyrrolidine, morpholine and N-methylpiperazine by the method disclosed by Mannich et al., Berichte, 57, 1108 (1924).

Compounds II are then reacted with a compound of the formula: R'''Y, wherein R''' is lower alkyl or monocyclic ar(lower alkyl), and Y is an anion, such as the anion of a strong acid, as exemplified by the mineral acids and organic acids, such as sulfonic acids. Such compounds include lower alkyl (e.g., methyl, ethyl and propyl) and monocyclic ar(lower alkyl) (e.g., benzyl and phenethyl) chlorides, bromides, iodides, methanesulfonates, and p-toluenesulfonates. Particularly preferred are methyl iodide and methyl bromide. In the preferred process the zwitterion is suspended or dissolved in a suitable solvent, such as acetone, dimethylformamide, tetramethylene sulfone and the like, and treated with the compound R'''Y in the cold to yield the new intermediates of this invention of the general Formula III:

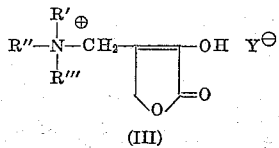

(III)

wherein R', R", R''' and Y are as hereinbefore defined.

Although the quaternary ammonium salts (Compounds III) can be isolated in solid form, if desired, in which event a volatile solvent, such as acetone, is preferably used as the solvent in the reaction, it is preferred to carry out the reaction in the same medium as used in the next step of the process and to use Compound III directly in solution in said next step.

Compound III is then reacted with a compound of the formula: Z—SH or Z—S$^{(-)}$, wherein Z is hydrogen or a radical which is easily exchangeable for hydrogen, such as an acyl radical (such as one of the acyl radicals mentioned hereinbefore), xanthyl, and guanyl. The preferred process consists of reacting the quaternary salt (Compound III), dissolved or suspended in a aprotic, polar solvent, such as dimethyl formamide and tetramethylene sulfone, with a compound of the formula Z—SH or Z—S$^{(-)}$ (optimally thioacetic acid or hydrogen sulfide)

and allowing the reaction to proceed to an optimum conversion. The process results in the preparation of new intermediates of this invention of the general Formula IV:

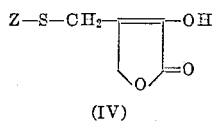

(IV)

wherein Z is as hereinbefore defined.

Compound IV can be recovered from the reaction medium by vacuum distillation and separation of the product from the unchanged starting material and/or by-products on the basis of their different solubilities in organic solvents. Thus after reacting the quaternary ammonium salt (Compound III) with, for example, thioacetic acid in dimethylformamide, Compound IV can be obtained in pure, crystalline form, after fractional distillation of the ether soluble part of the total reaction mixture. It is preferred, however, not to isolate Compound IV in pure form but rather to precipitate the unchanged starting materials and by-products from the reaction mixture and thus obtain a purified solution of Compound IV in the original solvent used in the preparation of the compound. This solution can then be used directly in carrying out the next step in the process of this invention.

Compound IV in solution is then treated with a base in the presence of a mild oxidizing agent, preferably in the presence of molecular oxygen (e.g., air). Among the bases which may be used can be mentioned ammonia and substituted amines, such as the amines listed hereinbefore, and alkali metal and alkaline earth metal hydroxides, alkoxides and amides (e.g. sodium hydroxide, sodium methoxide, potassium tert-butoxide, sodamide and potassium N-methylanilide). At least two moles of base are used per mole of Compound IV an excess of base being advantageously used if an ammonia or an amine is used and a stoichiometric amount of base being preferably used if an alkali metal or alkaline earth metal base is used. Moreover, if a compound wherein Z is hydrogen is employed as the reactant, the amount of base is halved.

The reaction results in the preparation of those compounds of this invention of the Formula I, wherein A is a base—that is the salts of this invention. If the reaction is carried out in the preferred solvents of this invention, such as dimethylformamide, tetramethylene sulfone and acetone, the salt precipitates from the reaction mixture in almost pure form and can be recovered by filtration or centrifugation. If other solvent systems are used, the salts can be isolated by methods known in the art, such as extraction, evaporation and the like.

The salts can then be converted to the free acid (Compound I, A and B are hydrogen) by treatment with a minimum of two moles per mole of salt of a strong acid, such as hydrochloric acid. The free acid can be recovered from the by-products formed on the basis of their different solubilities or different solvent distribution coefficients. The free acid can be further purified by recrystallization.

The free acid can be readily reconverted to its salt by treatment with either two or more moles of a base, such as those listed hereinbefore, whereby a bis salt is formed, or by one or less mole of base per mole of acid, whereby the acid-salt (Compounds I, wherein A is a cation and B is hydrogen) is obtained.

The esters of this invention can be prepared from the free acid by methods generally used to prepare enol esters from enols. Thus, treatment of the acid with a minimum of two moles of a ketene, or isopropenyl acylate, or with an acid anhydride or acyl halide of one of the acids listed hereinbefore, under the usual conditions, gives rises to the esters of this invention. The ester in turn can be reconverted to the salts by treatment with a minimum of two moles of base per mole of ester, and if only one mole of base is used the mixed ester-salts of this invention (Compounds I, A is acyl and B is a cation) are obtained. Moreover, these mixed ester-salts can be treated with one mole of acid to yield the mixed ester-acids of this invention (Compounds I, A is acyl and B is hydrogen).

The ethers of this invention can be prepared by reacting the free acid with a minimum of two moles of diazoalkane or diazoaralkane, such as diazo(lower alkane) (e.g., diazomethane and diazoethane) and a diazo(monocyclic ar-lower alkane) (e.g., diazophenylethane). The ethers can also be prepared by treating the starting materials with a diazoalkane or diazoaralkane and thus obtaining compounds of the general Formula V:

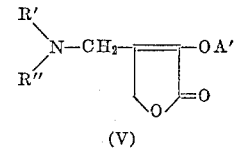

(V)

wherein R' and R" are as hereinbefore defined and A' is alkyl (preferably lower alkyl) or aralkyl [preferably monocyclic ar(lower alkyl)], and employing such compounds as the reactants in the remaining steps of the process of this invention.

The following examples illustrate the invention (all temperatures being in centigrade):

EXAMPLE 1

α-Hydroxy-β-Dimethylaminomethyl-α,β-Crotonolactone Zwitterion

[Compound II—R' and R" are methyl]

To a vigorously stirred slurry of silver carbonate [freshly prepared from 8.42 g. of silver nitrate and 2.64 g. of sodium carbonate in 150 ml. of ice cold water] there is added 7.40 g. of α-hydroxy-β-dimethylaminomethyl-α,β-rotonolactone hydrochloride dissolved in 75 ml. of ice cold water. After five minutes, the mixture is centrifuged and into the clear solution, there is introduced hydrogen sulfide for five minutes. After a second contrifugation, the green solution is lyophilized to yield about 5.68 g. (96. 1%) of α-hydroxy-β-dimethylaminoethyl-α,β-crotonolactone zwitterion as a white solid.

$$UV: \lambda_{max.}^{H_2O} = 267 \text{ m}\mu, \epsilon = 9000.$$

Analysis.—Calcd. for $C_7H_{11}NO_3$: C, 53.49; H, 7.05; N, 8.91. Found: C, 53.46; H, 7.11; N, 8.96.

EXAMPLE 2

To a suspension of 166 mg. of silver acetate in 5 ml. of acetic acid there is added 193 mg, of α-hydroxy-β-dimethylaminomethyl-α,β-crotonolactone hydrochloride. After 30 minutes at room temperature, the solution is centrifuged and lyophilized. The α-hydroxy-β-dimethylaminomethyl-α,β-crotonolactone zwitterion is obtained in the form of an amorphorus solid which still contains some acetic acid.

EXAMPLE 3

α-Hydroxy-β-N-Piperidinomethyl-α,β-Crotonolactone Zwitterion

[Compound II—R' and R" together are 1,5-pentylidene]

α - Hydroxy - β-N-piperidinomethyl-α,β-crotonolactone hydrochloride when treated under the conditions specified in Examples 1 or 2, yields α-hydroxy-β-N piperidinomethyl-α,β-crotonolactone zwitterion.

EXAMPLE 4

α-Hydroxy-β-Dimethylaminomethyl-α,β-Crotonolactone Methiodide

[Compound III—R', R" and R"' are methyl, Y is iodide]

To a cooled suspension of 1.00 g. of α-hydoxy-β-dimethylaminomethyl-α,β-crotonolactone zwitterion in 25 ml. of dry acetone there is added 10 ml. of methyl iodide.

After stirring overnight at +8°, the mixture is evaporated to dryness to yield about 1.93 g. of α-hydroxy-β-dimethylaminomethyl-α,β-crotonolactone methiodide.

EXAMPLE 5

*α-Hydroxy-β-Dimethylaminomethyl-α,β-Crotonolactone Methobromide*

[Compound III—R', R" and R'" are methyl, Y is bromide]

Into a cooled suspension of 5.00 g. of α-hydroxy-β-dimethylaminomethyl-α,β-crotonolactone zwitterion in 92 ml. of dry dimethylformamide there is introduced 120.0 g. of methylbromide gas. After addition of 0.05 g. of sodium iodide, the mixture is allowed to stand at +8° for 45 minutes. Then the excess methyl bromide is distilled off in moderate vacuo. The suspension thus obtained contains α-hydroxy-β-dimethylaminomethyl-α,β-crotonolactone methobromide butyrolactone, which can be isolated by either of the following methods: (a) high vacuum evaporation or (b) precipitation by addition of a large volume of dry ether followed by filtration.

EXAMPLE 6

The reaction described in Example 5 is carried out using tetramethylene sulfone as a solvent rather than dimethylformamide to yield the same product.

EXAMPLE 7

*α-Hydroxy-β-N-Piperidinomethyl-α,β-Crotonolactone-Ethotoluene Sulfonate*

[Compound III—R' and R" together are 1,5-pentylidene, R'" is ethyl, Y is p-toluenesulfonate]

A suspension of α-hydroxy-β-N-piperidinomethyl-α,β-crotonolactone zwitterion in methyl-ethyl ketone is treated with 1 mole of ethyl p-toluenesulfonate to yield α-hydroxy-β-N-piperidinomethyl-α,β-crotonolactone ethotoluene sulfonate.

EXAMPLE 8

*α-Hydroxy-β-Acetylmercaptomethyl-α,β-Crotonolactone*

[Compound IV—A is hydrogen, Z is acetyl]

A suspension of α-hydroxy-β-dimethylaminomethyl-α,β-crotonolactone methobromide in dimethylformamide, as prepared in Example 5, is treated with 9.00 ml. of thioacetic acid first at room temperature, then at 85° for 7 hours. By careful evaporation of the solvent and ethereal extraction of the residue about 3.43 of yellow oil is isolated which, on vacuum distillation, yields 2.02 g. of dimethylthioformamide as a forerun and (at 120°/0.005 mm.) about 0.96 g. of α-hydroxy-β-acetylmercaptomethyl-α,β-crotonolactone as a white solid of M.P. about 70–74°.

*Analysis.*—Calcd. for $C_7H_8O_4S$: C, 44.69; H, 4.29; S, 17.05; acetyl, 22.80. Found: C, 44.81; H, 4.21; S, 17.34; acetyl, 22.66.

EXAMPLE 9

Proceeding exactly as described in Example 8 but using tetramethylene sulfone rather than dimethylformamide as the solvent, a solution of α-hydroxy-β-acetylmercaptomethyl-α,β-crotonolactone in that solvent is obtained from which part of the by-products and unreacted starting material is eliminated by precipitation with methylene dichloride.

EXAMPLE 10

*α-Hydroxy-β-Mercaptomethyl-α,β-Crotonolactone*

[Compound IV—A and Z are hydrogen]

Into a suspension of α-hydroxy-β-dimethylaminomethyl-α,β-crotonolactone methobromide in tetraethylene sulfone, as obtained in Example 6, there is introduced hydrogen sulfide gas until saturation at room temperature. After 24 hours, the excess gas is eliminated by vacuum treatment and the unchanged starting material and by-products are precipitated by addition of methylene dichloride. A tetramethylene sulfone solution of α-hydroxy-β-mercaptomethyl-α,β-crotonolactone is obtained.

EXAMPLE 11

*α-Hydroxy-β-Isothioureidomethyl-α,β-Crotonolactone*

[Compound IV—A is hydrogen, Z is $H_2N$—C(NH)—]

α-Hydroxy-β-N-piperidinomethyl-α,β-crotonolactone ethotoluenesulfonate is suspended in dimethylformamide and treated with thiourea to yield α-hydoxy-β-isothioureidomethyl-α,β-crotonolactone.

EXAMPLE 12

*α-Hydroxy-β-Ethoxydithiocarbonylmethyl-α,β-Crotonolactone*

[Compound IV—A is hydrogen, Z is $C_2H_5O$—C(S)—]

Following the procedure of Example 11 but substituting potassium ethyl xanthate for the thiourea, α-hydroxy-β-thoxydithocarbonlmethyl-α,β-crotonolactone is obtained.

EXAMPLE 13

*Bis-(α-Hydroxy-α,β-Crotonolactone-β-Methylene) Disulfide, Diammonium Salt*

[Compound I—A and B are ammonium]

Into a solution of α-hydroxy-β-acetylmercapto-α,β-crotonolactone obtained as described in Example 10, there is introduced dry ammonia gas. After 1 hour, 10 ml. of absolute ether is suspended and the mixture is allowed to crystallize overnight (+8°). About 251 mg. of bis-(α-hydroxy-α,β-crotonolactone-β-methylene)disulfide, diammonium salt (Compound I—A and B are ammonium) is obtained by filtration and washing with ether and ethyl acetate.

$$\lambda_{max.}^{MeOH} = 246\ m\mu,\ \epsilon = 14{,}560$$

*Analysis.*—Calcd. for $C_{10}H_{16}O_6S_2N_2$: N, 8.64; S, 19.70. Found: N, 7.39; S, 18.00.

EXAMPLE 14

*Bis-(α-Hydroxy-α,β-Crotonolactone-β-Methylene) Disulfide*

[Compound I—A and B are hydrogen]

101 mg. of the diammonium salt of bis-(α-hydroxy-α,β-crotonolactone-β-methylene)disulfide is covered with 5 ml. of cold ethyl acetate and shaken with 2.5 ml. of normal hydrochloric acid. The organic layer gives, after drying and evaporation about 82 mg. of the acid product, M.P. about 128–132°. After recrystallization from t-butanol, the M.P. is about 133–134°.

$$\lambda_{max.}^{EtOH} = 244\ m\mu,\ \epsilon = 22{,}600$$

*Analysis.*—Calcd. for $C_{10}H_{10}O_6S_2$: C, 41.39; H, 3.47; S, 22.10. Found: C, 41.17; H, 3.97; S, 22.02.

EXAMPLE 15

Into a cooled solution of α-hydroxy-β-acetylmercaptomethyl-α,β-crotonolactone in dry acetone there is introduced dry ammonia. Immediately, a product precipitates which on exposure to air is soon converted to the diammonium salt of bis-(α-hydroxy-α,β-crotonolactone-β-methylene)disulfide.

EXAMPLE 16

*Bis-(α-Hydroxy-α,β-Crotonolactone-β-Methylene) Disulfide, Di(Monomethylamine) Salt*

[Compound I—A and B are methylamine]

Following the procedure of Example 15, but substituting dry monomethylamine for the dry ammonia and dimethylformamide for the acetone, yields the di(monomethylamine) salt of bis-(α-hydroxy-α,β-crotonolactone-β-methylene)disulfide.

EXAMPLE 17

*Bis-(α-Hydroxy-α,β-Crotonolactone-β-Methylene) Disulfide, Di(Dimethylamine) Salt*

[Compound I—A and B are dimethylamine]

Following the procedure of Example 15 but introducing dry dimethylamine into a tetramethylene sulfone solution of α-hydroxy-β-ethoxydithiocarbonylmethyl-α,β-crotonolactone, results in the preparation of the di(dimethylamine)salt of bis-(α-hydroxy-α,β-crotonolactone-β-methylene)disulfide.

EXAMPLE 18

*Bis-(α-Hydroxy-α,β-Crotonolactone-β-Methylene) Disulfide, Disodium Salt*

[Compound I—A and B are sodium]

Two moles of sodium amide are added to the tetramethylene sulfone solution of α-hydroxy-β-acetylmercaptomethyl-α,β-crotonolactone obtained from the reaction described in Example 10. The disodium salt of bis-(α-hydroxy-α,β-crotonolactone-β-methylene)disulfide is obtained as a precipitate.

EXAMPLE 19

*Bis-(α-Hydroxy-α,β-Crotonolactone-β-Methylene) Disulfide, Dipotassium Salt*

[Compound I—A and B are potassium]

Following the procedure of Example 18 but substituting an equivalent amount of potassium tert-butoxide for the sodium amide, the dipotassium salt is formed.

EXAMPLE 20

*Bis-(α-Hydroxy-α,β-Crotonolactone-β-Methylene) Disulfide, Magnesium Salt*

[Compound I—A and B are magnesium]

Following the procedure of Example 18 but substituting an equivalent amount of magnesium methoxide for the sodiumamide, the magnesium salt is formed.

EXAMPLE 21

*Bis-(α-Hydroxy-α,β-Crotonolactone-β-Methylene) Disulfide Diacetate*

[Compound I—A and B are acetyl]

By treating bis-(α-hydroxy-α,β-crotonolactone-β-methylene)disulfide with an excess of isopropenyl acetate in dry acetone and evaporation bis-(α-hydroxy-α,β-crotonolactone-β-methylene)disulfide diacetate is obtained.

EXAMPLE 22

*Bis-(α-Hydroxy-α,β-Crotonolactone-β-Methylene Disulfide Dipropionate*

[Compound I—A and B are propionyl]

One mole of the dipotassium salt of bis-(α-hydroxy-α,β-crotonolactone-β-methylene)disulfide in a tetramethylene sulfone suspension is stirred with two moles of propionyl chloride to yield the dipropionate ester.

EXAMPLE 23

*Bis-(α-Methoxy-α,β-Crotonolactone-β-Methylene) Disulfide*

[Compound I—A and B are methyl]

A cold solution of 180.6 mg. of bis-(α-hydroxy-α,β-crotonolactone-β-methylene)disulfide in 1 ml. of absolute methanol is treated with 2.5 ml. of one molar ethereal diazomethane solution. On evaporation, about 203.2 mg. of oil is obtained which crystallizes slowly. Recrystallization from chloroform-hexane yields the pure dimethyl ether of M.P. about 56–59°.

EXAMPLE 24

*Bis-(α-Ethoxy-α,β-Crotonolactone-β-Methylene) Disulfide*

[Compound I—A and B are ethyl]

Following the procedure of Example 23 but substituting two moles of diazoethane for the diazomethane yields the diethyl ether.

This invention may be variously otherwise embodied within the scope of the appended claims.

What is claimed is:
1. A compound of the formula

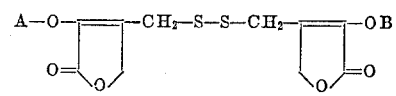

wherein A and B are each selected from the group consisting of hydrogen, alkali metal, alkaline earth metal, ammonium, substituted ammonium, lower alkyl, phenyl-lower alkyl, and the acyl radical of an unsubstituted hydrocarbon carboxylic acid of less than twelve carbon atoms.

2. Bis - (α-hydroxy-α,β-crotonolactone-β-methylene)disulfide.

3. An alkali metal salt of bis-(α-hydroxy-α,β-crotonolactone-β-methylene)disulfide.

4. The diammonium salt of bis-(α-hydroxy-α,β-crotonolactone-β-methylene)disulfide.

5. Bis - [α-(lower alkoxy)-α,β-crotonolactone-β-methylene]disulfide.

6. Bis - (α-methoxy-α,β-crotonolactone-β-methylene)disulfide.

7. α - Hydroxy-β-acetylmercaptomethyl-α,β-crotonolactone.

8. α - Hydroxy-β-isothioureidomethyl-α,β-crotonolactone.

9. α-Hydroxy - β - ethoxydithiocarbonylmethyl-α,β-crotonolactone.

10. α - Hydroxy-β-acylmercaptomethyl-α,β-crotonolactone, wherein the acyl radical is that of an unsubstituted hydrocarbon carboxylic acid of less than twelve carbon atoms.

References Cited in the file of this patent

UNITED STATES PATENTS 2,495,246    Fox et al. _____ Jan. 24, 1950

OTHER REFERENCES

Mannich et al.: Berichte, vol. 57 (1924), pp. 1108–1115.

Mannich et al.: Berichte, vol. 58 (1925), pp. 1330 and 1332.

Karrer: Org. Chem., Elsevier, New York (1938), pp. 112 and 113.

Wagner et al.: Synthetic Org. Chem., Wiley, New York (1953), p. 797.

Lacey: J. Chem. Soc. (1954), p. 835.

Reid: Org. Chem. of Bivalent Sulfur, vol. 1 (1958), pp. 118, 120.